(12) United States Patent
Pierce et al.

(10) Patent No.: US 11,488,245 B2
(45) Date of Patent: *Nov. 1, 2022

(54) DERIVATIVE CONTRACTS THAT SETTLE BASED ON TRANSACTION DATA

(71) Applicant: Chicago Mercantile Exchange Inc., Chicago, IL (US)

(72) Inventors: Ryan Pierce, Chicago, IL (US); Mansoor Ahmed, Naperville, IL (US); John Plante, Chicago, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/169,688

(22) Filed: Feb. 8, 2021

(65) Prior Publication Data

US 2021/0158448 A1 May 27, 2021

Related U.S. Application Data

(63) Continuation of application No. 15/199,131, filed on Jun. 30, 2016, now Pat. No. 10,949,922.

(51) Int. Cl.
| | |
|---|---|
| *G06Q 40/00* | (2012.01) |
| *G06Q 40/04* | (2012.01) |
| *G06Q 20/38* | (2012.01) |
| *G06Q 50/18* | (2012.01) |

(52) U.S. Cl.
CPC ........... *G06Q 40/04* (2013.01); *G06Q 20/381* (2013.01); *G06Q 50/18* (2013.01); *G06Q 2220/00* (2013.01)

(58) Field of Classification Search
None
See application file for complete search history.

(56) References Cited

U.S. PATENT DOCUMENTS

| 8,438,099 | B2 | 5/2013 | Co |
| 8,527,393 | B2 | 9/2013 | Boudreault |
| 8,738,503 | B2 | 5/2014 | Grombacher |
| 2013/0024344 | A1* | 1/2013 | Boberski ............... G06Q 40/04 705/37 |
| 2016/0086175 | A1* | 3/2016 | Finlow-Bates ...... G06Q 20/401 705/77 |

OTHER PUBLICATIONS

Nakamoto, S., "Bitcoin: A peer-to-peer electronic cash system," Oct. 31, 2008.*
Bitcoin, Economics: "The tech of bitcoin," Feb. 27, 2014, Retrieved from the Internet: http://www.goodmath.org/blog/2014/02/27/the-tech-of-bitcoin/.*

* cited by examiner

*Primary Examiner* — Olabode Akintola
(74) *Attorney, Agent, or Firm* — Lempia Summerfield Katz LLC

(57) ABSTRACT

The disclosed systems and methods make derivatives contracts based on an underlying virtual currency available for trading. Certain derivatives contracts have a settlement value based on the transaction fees associated with recording and/or performing transactions for the selected virtual currency. The contracts can be used, for example, by virtual currency miners against certain risks associated with mining virtual currency.

20 Claims, 4 Drawing Sheets

DERIVATIVE CONTRACTS THAT SETTLE BASED ON TRANSACTION DATA

REFERENCE TO RELATED APPLICATIONS

This application is a continuation under 37 C.F.R. § 1.53(b) of U.S. patent application Ser. No. 15/199,131 filed Jun. 30, 2016 now U.S. Pat. No. 10,949,922, the entire disclosure of which is hereby incorporated by reference and relied upon.

BACKGROUND

Some cryptocurrencies, or virtual currencies that utilize cryptography for security purposes, implement transaction fees that may be specified by transaction submitters. The transaction fees may be calculated as transaction differences, which can vary depending on network utilization.

DETAILED DESCRIPTION

Figure 1:
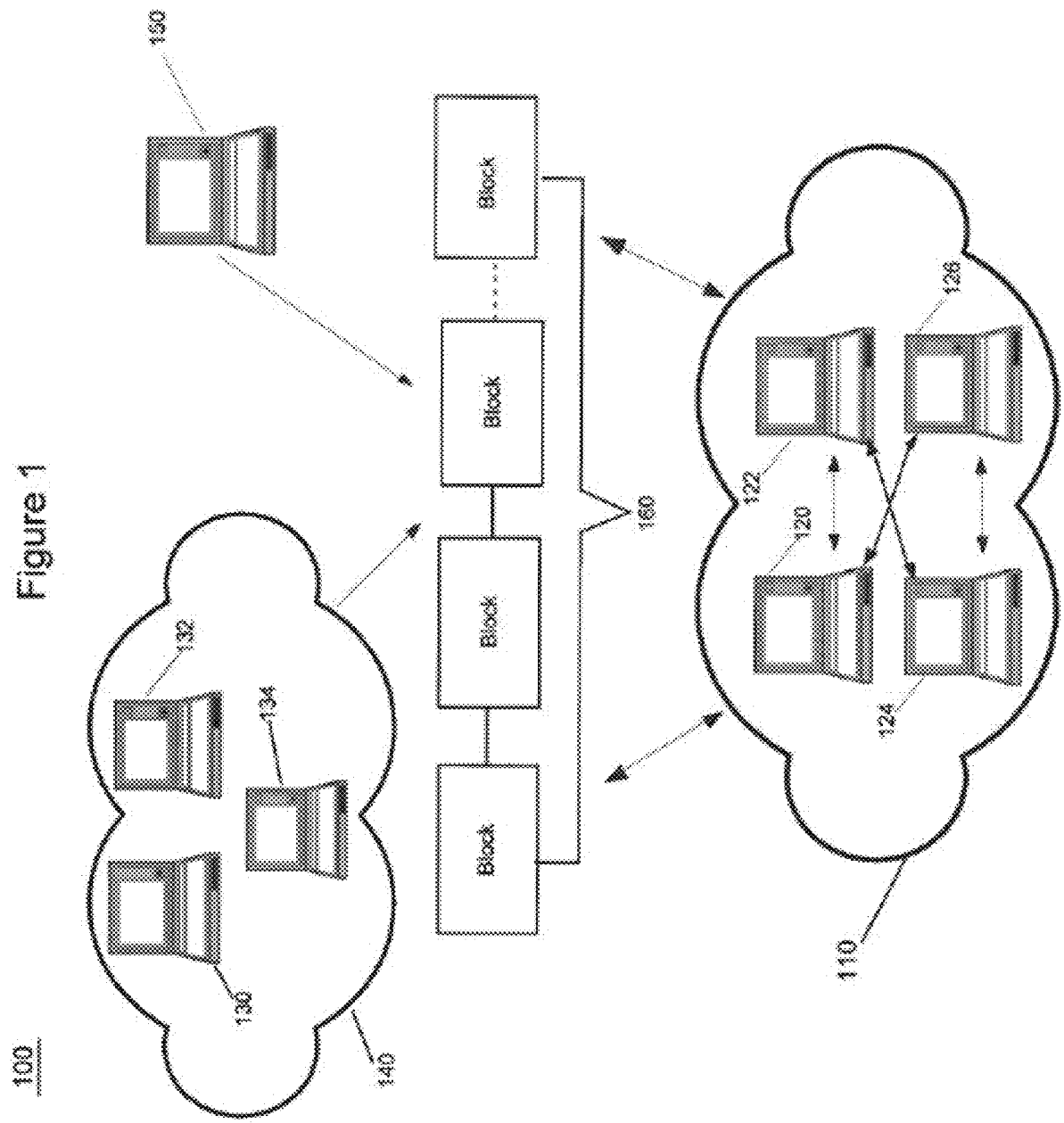
FIG. 1 depicts an illustrative Bitcoin mining system.

"Cryptocurrency" refers to a subset of virtual currencies that utilize cryptography for security purposes. A virtual currency, in turn, is defined by the U.S. Department of Treasury's Financial Crimes Enforcement Network ("FinCEN") as "a medium of exchange that operates like a currency in some environments, but does not have all the attributes of a real currency. In particular, virtual currency does not have legal tender status in any jurisdiction." FinCEN further defines a convertible virtual currency as virtual currency that "either has an equivalent value in real currency, or acts as a substitute for real currency." More specifically, convertible virtual currency may be bought and sold for legal tender.

Certain cryptocurrencies utilize transaction fees, which may be mandatory or optional, i.e., the choice of the transaction submitter. One example of a cryptocurrency is the Bitcoin virtual currency. The Bitcoin virtual currency is based on a cryptography technique in which transactions between parties on a peer-to-peer computer network are verified on a public ledger. The public ledger is also known as a blockchain and is made up of a series of one or more digital blocks. Each party on the peer-to-peer network stores a copy of the blockchain. When a financial transaction between parties takes place, it must be verified. New blocks are created as transactions are verified, and when new blocks are created, the blockchain is updated to include the new block and, accordingly, to account for the new transaction.

Parties that generate new blocks in a Bitcoin blockchain using computers on the peer-to-peer network are commonly referred to as Bitcoin miners. The computers used to generate the new blocks are commonly referred to as mining computers or mining rigs. New blocks in the blockchain are generated when a Bitcoin miner uses a mining computer to generate a valid cryptographic signature for the newly created block. Generating this signature may be computationally expensive, as it requires generating an arbitrary number (nonce) that produces a SHA-256 hash with certain properties.

Generally speaking, Bitcoin miners use a brute force search algorithm when attempting to generate a valid signature for a block using their mining computers. The algorithm involves attempting every possible combination of nonce (e.g., sequentially or in a random order) until the block is created. If the mining computer tries every possible nonce without producing a valid signature, the mining computer can alter certain other parameters within the block and repeat the search attempt. Although any mining computer can theoretically find a nonce that generates a valid signature on any given attempt, generally speaking, the more combination attempts that a mining computer can perform over time, the higher the likelihood that the computer will successfully generate a valid signature. Therefore, a given miner's likelihood of success can generally be predicted by the rate at which the miner's mining computer performs calculations attempting to generate a valid signature. This rate is also referred to as a mining computer's hash rate. The performed calculations are also referred to as hashing operations. The cost of mining computers generally increases as the hash rate increases.

Additionally, the Bitcoin protocol is configured so only a limited number of Bitcoin can be mined, and that on average, every 10 minutes, one out of all mining computers operating globally will generate a valid signature. More specifically, the Bitcoin protocol includes an adjustable difficulty factor which directly influences the difficulty of mining a new block. More specifically, as the difficulty factor rises, the relative difficulty of computing a valid signature and mining a new block also rises.

The difficulty factor is currently configured with the target goal that the group of all Bitcoin miners operating globally will create a new block, on average, every 10 minutes. More specifically, the network adjusts the difficulty factor every 2,016 blocks based on the time it took miners on the network to create the previous 2,016 blocks. Based on an average rate of one new block being created every 10 minutes, the difficulty factor is adjusted, on average, every two weeks. The historical trend has been for an increasing number of miners using increasing computational and expensive resources to attempt to mine Bitcoin over time. Therefore, because the Bitcoin protocol is configured such that new Bitcoin are mined at a relatively constant rate, the historical trend has been for the Bitcoin difficulty factor to also increase over time.

For more detail on Bitcoin and blockchain, see U.S. patent application Ser. No. 15/166,829, filed on May 27, 2016, entitled "Bilateral Assertion Model And Ledger Implementation Thereof", and U.S. patent application Ser. No. 15/174,548, filed on Jun. 6, 2016, entitled "Data Payment and Authentication via a Shared Data Structure", all incorporated by reference herein and relied upon in their entireties.

Exemplary systems and methods as disclosed herein relate to listing and clearing contracts based on certain risks associated with virtual currency transactions. The contracts can be configured for trading using financial computer systems such as, for example, computer systems associated with a futures exchange (e.g., the Chicago Mercantile Exchange, Inc.). The contracts can be used, for example, to allow entities involved in many virtual currency transactions, e.g., a merchant payment processor or wallet provider, to minimize risks associated with fluctuating virtual currency transaction fees. Alternatively, virtual currency miners could utilize the disclosed embodiments to minimize risks against fluctuating incomes due to fluctuating virtual currency transaction fees.

More specifically, certain disclosed embodiments allow for the listing and clearing of contracts based on transaction fees associated with a given virtual currency. The contracts can be configured to have a value, on settlement, based on the virtual currency's transaction fees multiplied by a conversion factor as defined in the contract. As will be described in further detail below, these embodiments provide virtual currency miners with a valuable tool they can use to minimize the financial risks associated with a virtual currency's transaction fees.

While the disclosed embodiments will be discussed with respect to the Bitcoin virtual currency, it will be appreciated that the disclosed embodiments may be applicable to any virtual currency now available or later developed that utilizes transaction fees as described herein. Examples of these virtual currencies include, but are not limited to, Peercoin, Dogecoin, and Litecoin. Additionally, while the disclosed embodiments will be discussed with respect to examples of charging fees for performing transactions related to virtual currencies, it will be appreciated that the disclosed embodiments may be applicable to any method for charging fees for transferring virtual currency.

Although virtual currency transaction fees are described as comprising the difference between input and output, virtual currency transaction fees may be calculated in a variety of ways, all of which are contemplated herein. For example, a virtual currency network, e.g., Ethereum, may be configured to assess transaction fees based on the computing power required to execute smart contract code. Or, a virtual currency network may allow users to specify debits and/or credits associated with their transactions, such that the transaction fee is explicitly specified without needing any difference calculation. In one embodiment, the transaction fees may be defined by the transaction submitter in a field, so that again, the transaction fee is explicitly specified without needing any difference calculation. In one embodiment, the transaction fees may be based on the frequency of transactions submitted by a user, so that the more transactions a user submits, the higher the transaction fees for that user.

Referring back to the Bitcoin virtual currency example, for example, a Party A may wish to send a quantity of Bitcoin to Party B. Party A may accordingly submit a transaction to the Bitcoin network. The transaction may include a list of inputs, e.g. transactions where Party A has received Bitcoin in the past that Party A wishes to redeem and spend, and a list of outputs, e.g. the criteria under which another party or parties may spend the Bitcoin, and the quantity of Bitcoin each party may spend. Party A need not specify inputs equal to the amount Party A desires to send to Party B. For example, if Party A specifies inputs of 2 Bitcoin and 3 Bitcoin, Party A could specify an output of 4 Bitcoin payable to Party B, and 1 Bitcoin payable to Party A. Such a transaction could be comparable to "making change", as one might do with cash.

Party A may send this transaction to the Bitcoin peer-to-peer network. Bitcoin miners may validate the transaction, add the transaction to a proposed block that they wish to add to the blockchain, and compete by performing math operations to find the solution to a problem that will give a miner the right to add this proposed block to the blockchain in a process known as mining that utilizes proof-of-work. The first successful miner who solves the math problem will publish this block via the Bitcoin peer-to-peer network, this block will be deemed the next block in the blockchain, and the process will repeat continually. Miners have an incentive to compete in mining blocks due partly to a block reward they are allowed to claim after successfully mining a block. This reward currently amounts to 25 Bitcoin.

Currently, the maximum allowed size of a block added to the blockchain is 1 megabyte. This places a limit on the number of transactions a miner may add to any given block. As the rate of transactions submitted the Bitcoin network rises, the number of proposed transactions pending inclusion in a block may exceed the space available within a block.

The Bitcoin protocol allows the quantity of Bitcoin specified in the list of inputs to exceed the quantity of Bitcoin specified in the list of outputs. These are termed "transaction fees", and the miner who successfully mines a block is allowed to keep these transaction fees.

Transaction fees within Bitcoin are optional. However, because miners are free to decide which transactions to include in blocks, they may decline to include any transactions that have no transaction fee or a transaction fee they consider too low. Miners are more likely to include transactions that carry higher transaction fees over transactions with no fee or a low fee. For example, if the utilization of the Bitcoin network approaches the capacity limit defined by the maximum block size, transactions may take longer to be confirmed. Or, if the number of pending transactions needing validations increases, any one transaction may have to wait a longer amount of time to be validated and appear in blocks on the blockchain. Thus, there may be competitive pressure for users, e.g., such as Party A, to include higher transaction fees so that Party A's transaction may appear on the blockchain within a reasonable amount of time. If, on the other hand, for example, the maximum block size limit was raised, or the transaction volume fell, the market pressure to include higher transaction fees may be reduced.

In one embodiment, the disclosed contract may be determined based on the amount of average available space in the blocks, as defined by the virtual currency network protocol. Thus, as blocks are filled up with validated transactions, leaving less average available space in the blocks, the system determines a higher settlement value. In one embodiment, the system may settle the contract based on average available block space instead of transaction fees.

The Bitcoin blockchain is public. Entities wishing to submit transactions to the blockchain, like Party A, can examine the most recently issued blocks and estimate the transaction fees that other parties submitting transactions to the blockchain are paying. Users wishing to submit transactions may be able to examine the list of transactions awaiting inclusion in a block, which is known as the memory pool, or "mempool." Users can accordingly determine how many transactions are pending, the size of the pending transactions, and the associated transaction fees in order to make a competitive decision regarding what transaction fee to pay on a new transaction they wish to submit.

In one embodiment, the disclosed contract may be determined based on mempool data. For example, the system may access the list of transactions in the mempool, and determine a settlement value based on the mempool transaction list. If the mempool data suggests a high level of network utilization, the system may determine a higher settlement value as compared to conditions suggesting a low level of network utilization. The system may be configured to consolidate and/or synchronize all available mempool data, to ensure that all miners and nodes have access to the same mempool data.

The size of a transaction poses additional complications. Because transactions can have multiple inputs and multiple outputs, their size is variable. Given a fixed limit on maximum block size, a miner may consider the size of the transaction along with the optional transaction fee, when determining which transactions to include. For example, a 1 kilobyte transaction offering a 0.0001 Bitcoin fee may be more attractive for a miner to include in a block than a 10 kilobyte transaction offering a 0.0002 Bitcoin fee.

Thus, transaction fees are not constant, and are instead variable and based on market factors. Thus, users may not be able to know the amount of transaction fees that will be paid in the future to transfer Bitcoin using the Bitcoin network.

Businesses that depend on sending large numbers of Bitcoin transactions may incur a pricing risk due to the uncertainty in future Bitcoin transaction fees. Such risk affects wallet providers, merchant payment processors, Bitcoin exchanges, etc.

Moreover, miners who earn an income that includes collecting Bitcoin transaction fees may not be able to accurately plan for revenue from those transaction fees.

Bitcoin users cannot account for the cost of the transaction fees that they will need to pay in the future, nor can miners effectively account for the variability of the income they expect to receive from transaction fees.

Derivatives contracts may take many forms including, for example, futures contracts and over-the-counter (OTC) swap contracts. A futures contract is an instrument that may be bought or sold and obligate the buyer or seller to accept or make delivery of a particular instrument on a specified future date or during a specified future period. Typically, these contracts are identified by reference to the contract month which specifies when the delivery must take place. Upon delivery, a seller makes delivery of the specified quantity and quality of instrument, and the buyer accepts such delivery in return for a cash payment in a specified legal tender. For example, a given contract may require the delivery of 5,000 bushels of soybeans for an equivalent amount of USD. Another exemplary contract may require the delivery of 125,000 Euros for an equivalent amount of USD. Certain futures contracts are cash settled. That is, these futures contracts do not culminate in the delivery of a particular item for legal tender but instead, are settled by reference to a measure of the value in a specified legal tender of the subject item and expire thereupon.

An OTC swap contract may operate in a similar manner to a futures contract. OTC swap contracts, however, are generally regulated under a different set of laws and regulations than futures contracts. In spite of the different laws and regulations, OTC swap contracts can optionally be constructed similarly to futures contracts from an economic and functional standpoint.

Derivative contracts or instruments may also be constructed in the form of securities. Examples of these securities include Exchange Traded Funds (ETFs), certificates, and warrants. Currently, upwards of 90% of all global ETF trade is conducted in the U.S., while certificates and warrants are more popular on European exchanges.

Additionally, while derivative contracts generally contemplate final settlement via delivery or cash settlement, they may be traded such that the obligation to make or take delivery is offset by a counteracting transaction before the delivery day or period is reached. That is, a party can buy a futures contract one day and sell it at any time thereafter and prior to the delivery date or period. Therefore, the original obligation is offset without actually facilitating a delivery.

Among other things, derivatives contracts allow investors to minimize risk by providing offsetting compensation in case of an undesired event. Derivatives contracts may be used, for example, to minimize the risk associated with unexpectedly rising or falling prices of utilities or farm commodities.

Central Counterparty ("CCP") clearing is a process by which financial transactions in a particular financial instrument (e.g., equities or fixed income instruments, futures contracts, option contracts, etc.) are processed for bookkeeping purposes and subject to a level of safeguards or sureties to ensure the financial integrity of the transactions and to provide for compensation in the event of a default or failure of an entity in the clearing process. CCP clearing is commonly used in many markets. In particular, the Dodd-Frank financial reform bill specifically requires the application of CCP clearing in many OTC swap contracts. The clearing process generally involves execution, novation, bookkeeping, and financial safeguards, each of which will be described in further detail below.

Execution is the process by which a transaction is concluded. Transactions can be executed on a bilateral basis between two counterparties or on a multi-lateral basis through a physical trading system or an electronic trading system in which multiple traders interact with each other. The orders can be intermediated by executing brokers who handle order entries or they orders may be entered directly by an end user into an electronic trading system.

After a transaction is executed, it is novated. Novation involves assigning the executed transaction to a clearing house for bookkeeping purposes and the assessment of financial safeguards. Typically, transactions are financially intermediated by clearing members of the clearing house. A clearing house will typically only interact directly with clearing members, and the clearing members interact with their customers or marketplace end users.

Bookkeeping involves records keeping for transactions conducted using CCP clearing. Generally speaking a clearing house provides these records to its clearing members. The records may include information detailing particular transactions, the offset of buy vs. sell transactions, current open and outstanding positions, and/or the monies in the form of margins or performance bonds, in the form of cash or collateral, required to support such positions. In turn, the clearing members provide this information to their customers on a granular basis.

The clearing house provides financial safeguards in the form or financial guarantees or sureties that assures clearing members of the performance of contract obligations in the event of a default or other failure in the clearing process. In turn, clearing members provide some level of financial guarantee or surety to their customers to backstop their obligations. Typically, a clearing house will collect margins or other funds from its clearing members to assure performance of contractual obligations. Additionally, a clearing house may require that clearing members agree to post additional capital upon demand when needed (e.g., if there is a risk that another clearing member might default on its obligations). By doing this, a clearing house mutualizes the default or failure risk of its clearing members by aggregating funds to apply in the event of possible defaults or failures.

FIG. 1 depicts an illustrative Bitcoin mining system. Disclosed systems and methods can be used to generate contracts based on elements of Bitcoin mining systems such as the Bitcoin mining system 100. The Bitcoin mining system 100 depicted in FIG. 1 includes a peer-to-peer network 110 over which client computers 120, 122, 124, 126 conduct transactions. The transactions between the client computers 120, 122, 124, 126 are recorded in blockchain 160. Each client computer 120, 122, 124, 126 stores a copy of the blockchain 160, and as new transactions between the client computers 120, 122, 124, 126 take place, the blockchain 160 is updated to record the new transactions. Each client computer 120, 122, 124, 126 in the Bitcoin mining system 100 stores a copy of the updated blockchain locally.

The Bitcoin mining system 100 also includes mining computers 130, 132, 134, 150. As depicted in FIG. 1, mining computer 150 performs mining operations individually, while mining computers 130, 132, 134 combine computational resources and collectively operate as a mining pool 140. The mining computers 130, 132, 134, 150 can be configured to use a brute force search algorithm when attempting to create a new block for the blockchain 160. This algorithm involves performing calculations that use every possible arbitrary number (nonce) in a random or sequential order, as well as altering other fields within the new block, to try and generate a valid cryptographic signature for a new block. The new block is created when a valid signature is found. As discussed above, the rate at which calculations are performed by a mining computer 130, 132, 134, 150 is referred to as the mining computer's hash rate.

As mentioned above, mining computers 130, 132, 134, combine computational resources and collectively operate as a mining pool 140. By combining resources, the members of the mining pool 140 have a higher collective hash rate and a higher collective chance of collecting a reward than any of the individual members 130, 132, 134 would on their own. The mining pool 140 uses an algorithm to distribute a share of the collected rewards to each of the mining computers 130, 132, 134 in the mining pool 140, regardless of which of the mining computers 130, 132, 134 actually generates the new block and initially collects the reward. Over the long run, each of the mining computers 130, 132, 134 can generally expect to generate revenue equal to the total number of block rewards and optionally, transaction fees collected by the mining pool 140 multiplied by the percentage of the individual mining computer's 130, 132, 134 hash rate relative to the total hash rate of all the mining computers 130, 132, 134 in the pool 140. An operator of the mining pool 140 can optionally collect transaction fees, and/or a portion of the collected rewards, thereby reducing the rewards that the operators of the mining computers 130, 132, 134 collect, but this portion collected by the pool operator is generally small. The expected mining yield for any of the mining computers 130, 132, 134, 150 in the mining system 100 is directly related to the difficulty factor. As discussed above, the difficulty factor is generally configured with the target goal that the group of all Bitcoin miners operating globally will create a new block, on average, every 10 minutes.

Figure 2:
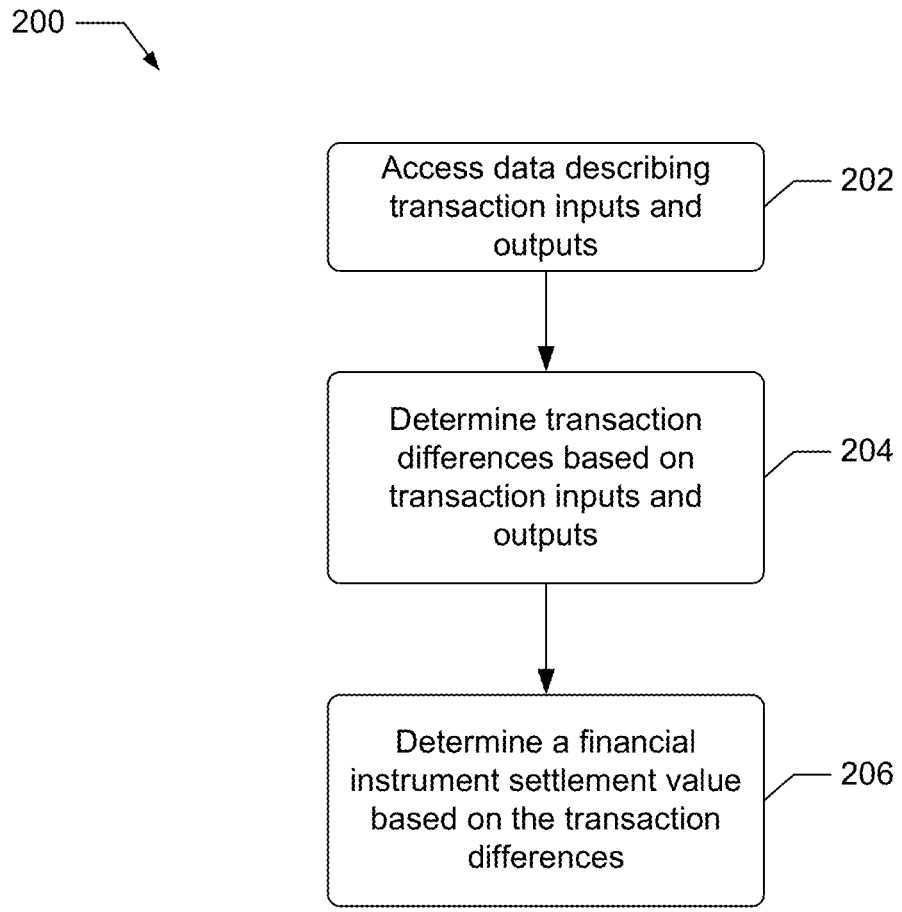
FIG. 2 depicts a flow diagram providing an overview of an example method for settling a contract configured to be traded via a financial computer system according to the present disclosure.

FIG. 2 depicts a flow diagram providing an overview of an example method 200 for settling a contract configured to be traded via a financial computer system according to the present disclosure. The steps depicted in FIG. 2 can be implemented, for example, using a clearing computer system, such as the clearinghouse 440 depicted in FIG. 4. The contract may be settled, for example, after being traded using a financial computer system, such as the financial computer system 400 depicted in FIG. 4. In certain embodiments, the financial computer system lists the contract, receives, and/or matches one or more orders to buy or sell the contract prior to settlement by the clearing computer system. The contract may take the form, for example, of a futures contract, an option contract, an OTC swap contract, or another financial instrument. The contract may culminate in cash settlement. While the contract remains a derivative transaction, and prior to the delivery, it is subject to a CCP clearing model.

At block 202, after a trade involving the contract has been conducted, a clearing computer system accesses transaction data describing transaction inputs and transaction outputs. As described herein, a virtual currency protocol may allow transaction submitters to specify transaction inputs and outputs for each transaction. The system may access data for multiple transactions for the same virtual currency, e.g., Bitcoin.

After the trade has been conducted, at block 204, the clearing computer system may calculate transaction fees as transaction differences for all Bitcoin transactions for a given period. The transaction difference for any one transaction may be calculated as the transaction input minus the transaction output. The transaction difference may in one embodiment be the amount the miner who successfully validates and works on a transaction (e.g., adds it to a block on the blockchain) is allowed to keep, as a reward for adding the transaction to the blockchain. For example, as described herein, upon increase in the utilization of a virtual currency network, transactions would take longer to be confirmed and validated. The transaction differences specified by a transaction submitter may be a way to entice miners to work on a given transaction, thus increasing the likelihood that the transaction appears on the blockchain. As network utilization increases and transaction processing time increases, transaction differences may rise, reflecting an increase in the amount of rewards transaction submitters are willing to give to transaction block miners. On the other hand, if network utilization decreases and thus transaction processing time decreases, transaction differences may also decrease, reflecting lower rewards transaction submitters are willing to give to transaction block miners. After accessing the transaction data and calculating the transaction differences, the clearing computer system determines a settlement value for the contract based on the transaction differences (block 206).

Figure 3:
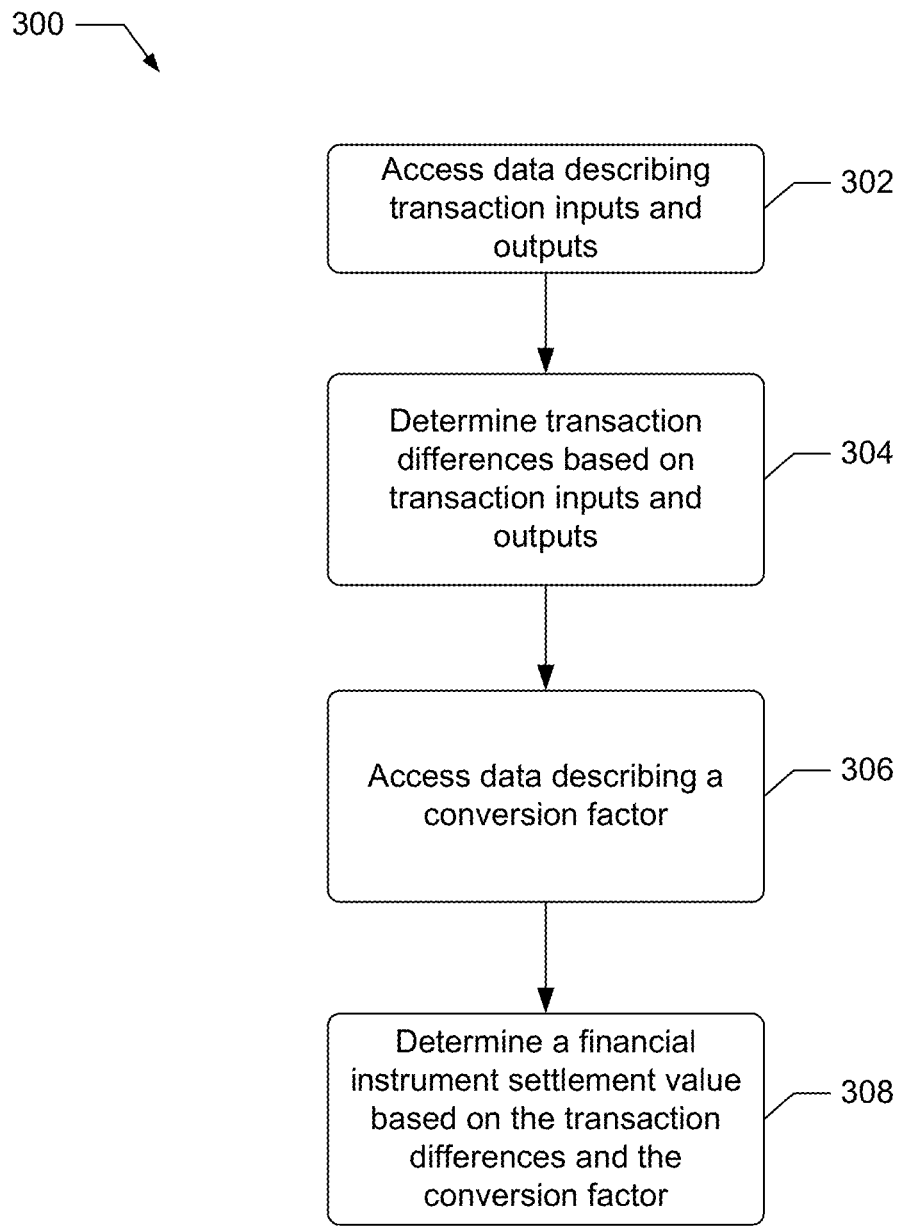
FIG. 3 depicts a flow diagram providing an overview of another example method for settling a contract configured to be traded via a financial computer system according to the present disclosure.

FIG. 3 depicts a flow diagram providing an overview of another example method 300 for settling a contract configured to be traded via a financial computer system according to the present disclosure. The steps depicted in FIG. 3 can be implemented, for example, using a clearing computer system, such as the clearinghouse 440 depicted in FIG. 4. The contract may be settled, for example, after being traded using a financial computer system, such as the financial computer system 400 depicted in FIG. 4. In certain embodiments, the financial computer system lists the contract, receives, and/or matches one or more orders to buy or sell the contract prior to settlement by the clearing computer system. The contract may take the form, for example, of a futures contract, an option contract, an OTC swap contract, or another financial instrument. The contract may culminate in cash settlement. While the contract remains a derivative transaction, and prior to the delivery, it is subject to a CCP clearing model.

At block 302, similar to block 202 in FIG. 2, after a trade involving the contract has been conducted, a clearing computer system accesses transaction data describing transaction inputs and transaction outputs. As described herein, a virtual currency protocol may allow transaction submitters to specify transaction inputs and outputs for each transaction. The system may access data for multiple transactions for the same virtual currency, e.g., Bitcoin.

After the trade has been conducted, at block 304, similar to block 204 in FIG. 2, the clearing computer system may calculate transaction fees as transaction differences for all Bitcoin transactions for a given period. The transaction difference for any one transaction may be calculated as the transaction input minus the transaction output. The transaction difference may in one embodiment be the amount the miner who successfully validates and works on a transaction (e.g., adds it to a block on the blockchain) is allowed to keep, as a reward for adding the transaction to the blockchain. For example, as described herein, upon increase in the utilization of a virtual currency network, transactions would take longer to be confirmed and validated. The transaction differences specified by a transaction submitter may be a way to entice miners to work on a given transaction, thus increasing the likelihood that the transaction appears on the blockchain. As network utilization increases and transaction processing time increases, transaction differences may rise, reflecting an increase in the amount of rewards transaction submitters are willing to give to transaction block miners. On the other hand, if network utilization decreases and thus transaction processing time decreases, transaction differences may also decrease, reflecting lower rewards transaction submitters are willing to give to transaction block miners.

After the trade has been conducted, the clearing computer system may access data describing a conversion factor associated with the virtual currency (block 306). In certain embodiments, the conversion factor can be included in the definition of the contract to be cleared and can be used to determine how much the contract will pay on settlement. For example, the conversion factor may describe a conversion rate from the transaction differences to a predetermined real currency (e.g., USD). In certain embodiments, the settlement value may be determined by multiplying the transaction differences by the conversion factor, while in other embodiments, other operations involving the transaction differences and the conversion factor may be performed to determine the settlement value.

After accessing the transaction data, calculating the transaction differences, and accessing the conversion factor, the clearing computer system determines a settlement value for the contract based on the transaction differences and the conversion factor (block 308).

Table 1 illustrates the construction of an exemplary futures contract that can be settled using the steps described with respect to FIGS. 2 and/or 3. While Table 1 illustrates a futures contract, many other contract designs (e.g., other futures contracts, swaps, options, etc.) are possible using the disclosed systems and methods. It may or may not include a conversion from the virtual currency used to pay the transaction fees (e.g. Bitcoin) to a real currency (e.g. US Dollars).

impossible to know in advance, by taking a short position in the contract, or being long a put option on the contract, a miner can lock in a projected growth rate of the transaction fees. If the transaction fees change, e.g., fees grow more slowly than anticipated or fall, the income from mining may fall, but the variation and settlement of the futures or the funds received by exercising a cash-settled put option contract would cover the loss. On the other hand, if the transaction fees change, e.g., grow, faster than anticipated, the income from mining may increase, which could offset the loss the miner would incur as the contract loses value or the put option premium expires as worthless.

The contract can also be used, for example, by mining hardware manufacturers to optimize their product inventory. More specifically, if the transaction fees fall, mining computers may become less marketable, so taking a short position in the generated contract, or being long a put option on the generated contract, would allow manufacturers to lock in a projected rate of change of transaction fees, or anticipated transaction fees over time, and minimize the risk of fluctuating transaction fees.

In certain embodiments, the contract can also be used in strategies involving other virtual currencies or with other related contracts. For example, the Peercoin virtual currency has the same mining hardware requirements as Bitcoin, so virtual currency miners can easily switch from mining for one currency to mining for the other currency. Because of this, there may be some relationship or correlation between the transaction fees of the two currencies and the relative values or exchange rate of the two currencies. Based on this relationship or correlation, in certain embodiments, the contract may be used in arbitrage strategies involving the two currencies.

For example, a user of this contract may be a Bitcoin wallet provider that accounts for 2% of all Bitcoin transactions. The wallet provider may be concerned that transaction fees may rise in the month of June and wishes to minimize that risk. In April, the wallet provider purchases 20 June contracts at a price of $10,000 per contract, which corresponds to an expectation that Bitcoin fees for the month of June will total $10 million. The wallet provider can then budget for spending $200,000 in transaction fees for the month of June.

During the month of June, the actual transaction fees amounted to $13 million. The wallet provider actually paid transaction fees comparable to all other Bitcoin users, and, accounting for 2% of all Bitcoin transactions, actually paid $260,000 in transaction fees. This is $60,000 more than the wallet provider had budgeted. However, the contract will settle at a price of $13,000. The 20 contracts will be worth $260,000, resulting in a $60,000 profit to the wallet provider which offsets the additional transaction fees the wallet provider paid during the contract month.

TABLE 1

| | |
|---|---|
| Contract Size | 1/1,000 of transaction fees paid during the contract month. |
| Minimum Price Increment (Tick) | $10.00 USD |
| Settlement Process | Cash settled vs. value of all Bitcoin transaction fees, converted on a daily basis to US Dollars, paid during the contract month * 0.001 |
| Contract Months | January, February, March, April, May, June, July, August, September, October, November, and December |
| Last Trading Day and Time | 2 PM (CT) on the last business day of the contract month. |
| Trading Hours | Sundays through Thursdays: 5PM-4PM (CT) next day. |

This contract allows users of virtual currency to minimize some of the risks associated with virtual currency transactions. Because the long-term state of the transaction fees is If, instead, the actual transaction fees were less than $10 million, the wallet provider will realize a loss on the futures contracts, however the wallet provider will also pay less than the $200,000 budgeted in transaction fees, and this savings would offset the loss incurred on the futures contracts.

Alternately, a Bitcoin miner may expect to mine 1% of all blocks and receive 1% of all Bitcoin transaction fees. The miner may want to lock in a price today and minimize the risk of transaction fees falling during the contract month. The miner could sell 10 contracts. If transaction fees do fall relative to the price the miner sold the futures contracts, the miner will realize a profit on the futures contracts that offsets the lower transaction fees that the miner receives. If transaction fees rise, the miner will realize a loss on the futures contracts, but will receive higher transaction fees that offset the loss.

In one embodiment, an index could be computed that would consist of the average transaction fee over the contract period. It may or may not include a conversion from the virtual currency used to pay the transaction fees (e.g. Bitcoin) to a real currency (e.g. US Dollars). Table 2 illustrates the construction of an exemplary futures contract that can be settled using the steps described with respect to FIGS. 2 and/or 3. While Table 2 illustrates a futures contract, many other contract designs (e.g., other futures contracts, swaps, options, etc.) are possible using the disclosed systems and methods.

TABLE 2

| | |
|---|---|
| Contract Size | 100,000 transactions |
| Minimum Price Increment (Tick) | $0.0005 USD |
| Settlement Process | Cash settled vs. value of index * 100,000. The index is valued at the average Bitcoin transaction fee, converted on a daily basis to US dollars, for all Bitcoin transactions during the contract period. |
| Contract Months | January, February, March, April, May, June, July, August, September, October, November, and December |
| Last Trading Day and Time | 2 PM (CT) on the last business day of the contract month. |
| Trading Hours | Sundays through Thursdays: 5PM-4PM (CT) next day. |

One user of the contract illustrated in Table 2 may be a Bitcoin wallet provider that expects to make 500,000 Bitcoin transactions during the month of June. In April, the wallet provider buys 5 June contracts priced at $0.08, which allows the wallet provider to budget for spending $40,000 in transaction fees. If the average transaction fee rises above $0.08 in the month of June, and the wallet provider makes 500,000 Bitcoin transactions, the wallet provider will realize a gain on the futures contracts which will offset the difference between fees spend and $40,000. If the average transaction fee falls below $0.08 in the month of June, the wallet provider will realize a loss on the futures contracts which can offset the savings the wallet provider realizes due to spending less in fees than budgeted. A Bitcoin miner could likewise sell this contract to minimize the risk of lost revenue due to the average transaction fee falling.

In one embodiment, an index could be computed that would consist of the average transaction fee per a specified unit of data size, e.g., kilobyte, over the contract period. It may or may not include a conversion from the virtual currency used to pay the transaction fees (e.g. Bitcoin) to a real currency (e.g. US Dollars). Table 3 illustrates the construction of an exemplary futures contract that can be settled using the steps described with respect to FIGS. 2 and/or 3. While Table 3 illustrates a futures contract, many other contract designs (e.g., other futures contracts, swaps, options, etc.) are possible using the disclosed systems and methods.

TABLE 3

| | |
|---|---|
| Contract Size | 100,000 kilobytes |
| Minimum Price Increment (Tick) | $0.0005 USD |
| Settlement Process | Cash settled vs. value of index * 100,000. The index is valued at the total Bitcoin transaction fees during the contract period, converted on a daily basis to US dollars, divided by the size in kilobytes of all Bitcoin transactions during the contract period. |
| Contract Months | January, February, March, April, May, June, July, August, September, October, November, and December |
| Last Trading Day and Time | 2 PM (CT) on the last business day of the contract month. |
| Trading Hours | Sundays through Thursdays: 5PM-4PM (CT) next day. |

A wallet provider may estimate the number of kilobytes of transactions they expect to make in a future month and then purchase futures contracts to minimize the risk of the price per kilobyte rising. A Bitcoin miner could likewise sell this contract to minimize the risk of lost revenue due to the average transaction fee per kilobyte falling.

In one embodiment, the disclosed embodiments may be implemented to produce an index that more accurately represents the types of Bitcoin transactions a market participant regularly performs, or receives mining fees from others performing. For example, the disclosed embodiments could be implemented to compute the index based on the average price, or average price per kilobyte, of a subset of transactions, such as those smaller than or larger than a pre-determined threshold. Or, the disclosed embodiments could be implemented to exclude transactions with no transaction fee from the computation of the index.

Blockchain technology may allow for representation of assets other than virtual currency. For example, ownership of stocks, bonds, precious metals, vehicles, real estate, etc. could be recorded on a blockchain. If the blockchain imposes a transaction fee for processing transactions on these assets, the disclosed embodiments could be implemented to create a derivatives contract that represents these transaction fees. For example, an automobile manufacturer may wish to purchase a derivative to minimize the risk of the transaction fees the manufacturer expects to pay to create digital certificates of title for cars that will be manufactured in the following year.

Although the present application discusses transaction fees, the application contemplates any fee, transaction or not, that a virtual currency network charges to a user. For example, a virtual currency network may charge users fees for encoding assets, e.g., digital assets, onto a distributed network. The disclosed embodiments may determine a settlement value for a contract based on the fees users are charged for encoding assets onto the network.

Figure 4:
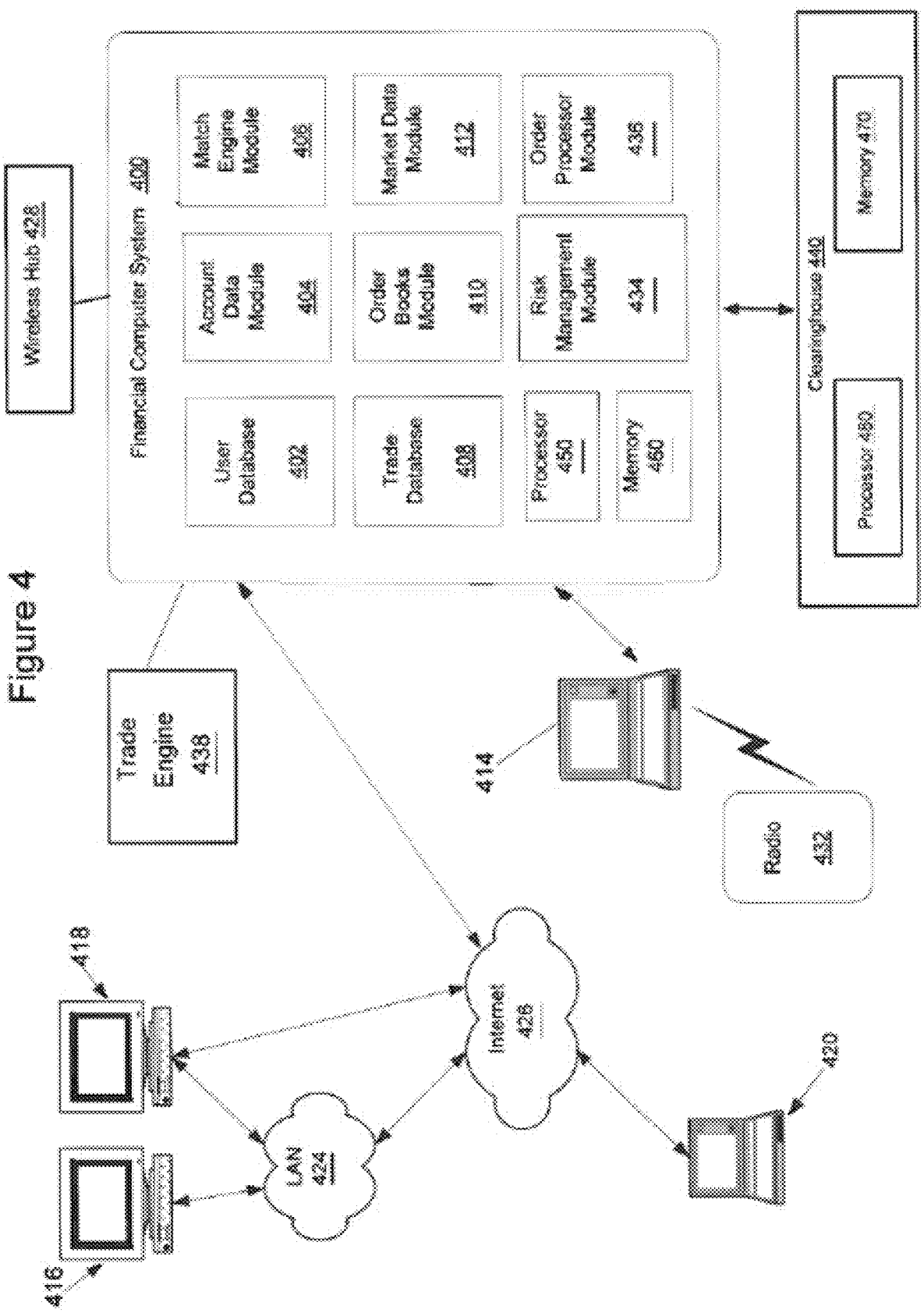
FIG. 4 depicts an exemplary financial computer network system that may be used to implement various aspects of the embodiments disclosed according to the present disclosure.

FIG. 4 depicts an exemplary computer network system that may be used to implement various aspects of the embodiments disclosed according to the present disclosure. The computer network system of FIG. 4 is only one example of a suitable system and is not intended to suggest any limitation as to the scope of use or functionality of the various embodiments of the disclosure. Aspects of the present disclosure can be implemented with computing devices and networks for exchanging, transmitting communicating, administering, managing and facilitating trading information including, but not limited to virtual currency spot rates and virtual currency transaction fees. The financial computer system 400 can be configured to generate or receive market data, list contracts, analyze data, and calculate various values (e.g., contract parameters), and perform other operations in accordance with aspects of the disclosure.

Financial computer system 400 may be implemented with one or more mainframes, servers, gateways, controllers, desktops or other computers. The financial computer system 400 may include one or more modules, processors, databases, mainframes, desktops, notebooks, tablet PCs, handhelds, personal digital assistants, smartphones, gateways, and/or other components, such as those illustrated in FIG. 4. Moreover, the financial computer system 400 may include one or more processors (e.g., Intel® microprocessor, AMD® microprocessor, RISC processor, etc.) such as processor 450 and one or more memories (e.g., solid state, DRAM, SRAM, ROM, Flash, non-volatile memory, hard drive, registers, buffers, etc.) such as memory 460. The memory 460 may store instructions that when executed by the one or more processors 450 cause one or more of the components of the financial computer system 400 to perform computer executable methods as disclosed herein.

In addition, an electronic trade engine 438, such as the Globex® trading system, may be associated with the financial computer system 400. In certain embodiments, the electronic trade engine 438 is incorporated into the financial computer system 400, while in other embodiments, the electronic trade engine is coupled to the financial computer system 400. In certain embodiments, the electronic trade engine 438 includes a combination of globally distributed computers, controllers, servers, networks, gateways, routers, databases, memory, and other electronic data processing and routing devices. The electronic trade engine 438 may include a trading system interface having devices configured to route incoming messages to an appropriate devices associated with the trading system. The trading system interface may include computers, controllers, networks, gateways, routers and other electronic data processing and routing devices. Orders that are placed with or submitted to the financial computer system 400 can be received at the trading system interface. The trading system interface can route the order to an appropriate device. By using the electronic trade engine 438, the financial computer system 400 can receive orders and transmit market data related to orders and trades to users. These orders may include, for example, orders to buy and/or sell contracts such as those disclosed herein.

A user database 402 may include information identifying traders and other users of financial computer system 400. Such information may include user names and passwords. A trader operating an electronic device (e.g., computer devices 414, 416, 418 and 420) interacting with the financial computer system 400 may be authenticated against user names and passwords stored in the user database 402. Furthermore, an account data module 404 may process account information that may be used during trades. The account information may be specific to the particular trader (or user) of an electronic device interacting with the financial computer system 400.

A match engine module 406 may match bid and offer prices for contracts configured in accordance with aspects of the disclosure. The match engine module 406 may be implemented with software that executes one or more algorithms for matching bids and offers for bundled financial instruments in accordance with aspects of the disclosure. Like other components of the financial computer system 400, in certain embodiments, the match engine module may perform operations based on instructions from processor 450. Additionally, the match engine module 406 and trading system interface may be separate and distinct modules or components or may be unitary parts. Further, the match engine module 406 may be configured to match orders (e.g., buy and sell orders) submitted to the trading system when the orders are equal. The match engine module 406 may match orders according to currently known or later developed trade matching practices and processes. In an embodiment, bids and orders are matched on price, on a first-in-first-out (FIFO) basis. The matching algorithm also may match orders on a pro-rata basis or combination of FIFO and pro-rata basis. Other processes and/or matching processes may also be employed.

Moreover, a trade database 408 may be included to store historical information identifying trades and descriptions of trades. In particular, a trade database may store information identifying or associated with the time that an order was executed and the contract price. The trade database 408 may also comprise a storage device configured to store at least part of the orders submitted by electronic devices operated by traders (and/or other users). A confirmation message may be sent when the match engine module 406 finds a match for an order and the order is subsequently executed. The confirmation message may, in some embodiments, be an e-mail message to a trader, an electronic notification in one of various formats, or any other form of generating a notification of an order execution.

Furthermore, an order book module 410 may be included to compute or otherwise determine current bid and offer prices. The order book module 410 may be configured to calculate the price of a financial instrument.

A market data module 412 may be included to collect market data and prepare the data for transmission to users. In addition, a risk management module 434 may be included in computer system 400 to compute and determine the amount of risk associated with a financial product or portfolio of financial products. An order processor module 436 may be included to receive data associated with an order for a financial instrument. The order processor module 436 may decompose delta based and bulk order types for processing by order book module 410 and match engine module 406. The order processor module 436 may be configured to process the data associated with the orders for financial instruments.

The trading network environment shown in FIG. 4 includes computer (i.e., electronic) devices 414, 416, 418 and 420. The computer devices 414, 416, 418 and 420 may include one or more processors, or controllers, that control the overall operation of the computer. The computer devices 414, 416, 418, and 420 may include one or more system buses that connect the processor to one or more components, such as a network card or modem. The computer devices 414, 416, 418, and 420 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet PC and like computing devices having a user interface. The electronic device may be a dedicated function device such as personal communications device, a portable or desktop telephone, a personal digital assistant ("PDA"), remote control device, personal digital media system and similar electronic devices.

Computer device 414 is shown directly connected to financial computer system 400. Financial computer system 400 and computer device 414 may be connected via a T1 line, a common local area network (LAN) or other mechanism for connecting computer devices. Computer device 414 is shown connected to a radio 432. The user of radio 432 may be a trader or exchange employee. The radio user may transmit orders or other information to a user of computer device 414. The user of computer device 414 may then transmit the trade or other information to financial computer system 400.

Computer devices 416 and 418 are coupled to a local area network (LAN) 424. LAN 424 may have one or more of the well-known LAN topologies and may use a variety of different protocols, such as Ethernet. Computers 416 and 418 may communicate with each other and other computers and devices connected to LAN 424. Computers and other devices may be connected to LAN 424 via twisted pair wires, coaxial cable, fiber optics or other media. Alternatively, a wireless personal digital assistant device may communicate with LAN 424 or the Internet 426 via radio waves. The PDA may also communicate with financial computer system 400 via a conventional wireless hub 428. As used herein, a PDA includes mobile telephones and other wireless devices that communicate with a network via radio waves.

FIG. 4 also shows LAN 424 connected to the Internet 426. LAN 424 may include a router to connect LAN 424 to the Internet 426. Computer device 418 is shown connected directly to the Internet 426. The connection may be via a modem, DSL line, satellite dish or any other device for connecting a computer device to the Internet.

The operations of computer devices and systems shown in FIG. 4 may be controlled by computer-executable instructions stored on computer-readable storage medium. Embodiments also may take the form of electronic hardware, computer software, firmware, including object and/or source code, and/or combinations thereof. Embodiments may be stored on computer-readable media installed on, deployed by, resident on, invoked by and/or used by one or more data processors (e.g., RISC processor), controllers, computers, clients, servers, gateways, networks of computers, and/or any combinations thereof. The computers, servers, gateways, may have one or more controllers configured to execute instructions embodied as computer software. For example, computer device 414 may include computer-executable instructions for receiving transaction data and other information from financial computer system 400 and displaying this information to a user. In another example, computer device 418 may include computer-executable instructions for receiving market data from financial computer system 400 and displaying that information to a user. In yet another example, a processor of financial computer system 400 may be configured to execute computer-executable instructions that cause the financial computer system 400 to calculate a performance bond amount required to balance risk associated with a portfolio.

One or more market makers may make and/or maintain a market by providing bid and offer prices for a derivative or security to financial computer system 400. The financial computer system 400 may also exchange information with other trade engines, such as trade engine 438. One skilled in the art will appreciate that numerous additional computers and systems may be coupled to the financial computer system 400. In certain embodiments, these additional computers and systems may be incorporated into the financial computer system 400. Such computers and systems may include clearing, regulatory and fee systems, such as clearinghouse 440. Coupling can be direct as described or any other method described herein.

The clearinghouse 440 enables the financial computer system 400 to provide contracts with a lower likelihood of default than OTC products. More specifically, the clearinghouse 440 arranges for transactions to be settled and cleared. In certain embodiments, clearinghouse 440 may be configured to settle and/or clear transactions using the methods described herein. In certain embodiments, the clearinghouse 440 performs operations based on instructions stored on memory 460 and executed by processor 450. In other embodiments, the clearinghouse 440 can perform operations based on instructions stored on locally stored memory 470 and executed by local processor 480.

Clearing is the procedure through which the clearinghouse 440 becomes buyer to each seller of a contract (e.g., futures contract, equities, currencies, interest rate products, etc.), and seller to each buyer, and assumes responsibility for protecting buyer and seller from financial loss by assuring performance on each contract. A clearinghouse 440 may settle trading accounts, clear trades, collect and maintain performance bond funds, regulate delivery and report trading data. In some scenarios an exchange may operate its own clearinghouse 440 through a division of the exchange through which all trades made are confirmed, matched, and settled each day until offset or delivered. Alternatively, one or more other companies may be provided the responsibility of acting as a clearinghouse 440 with the financial computer system 400 (and possibly other financial computer systems). The financial computer system 400 may be associated with one or more clearinghouses 440. Additionally, the financial computer system 400 may offer firms qualified to clear trades to provide a clearinghouse 440 for the financial computer system 400. In some instances, these clearing members may be designated into different categories based on the type of commodities they can clear and other factors.

The clearinghouse 440 may establish minimum performance bond (i.e., margin) requirements for the products it handles. A customer may be required to deposit a performance bond with the clearinghouse 440 (or designated account) for the purpose of insuring the clearinghouse 440 against loss on open positions. The performance bond helps ensure the financial integrity of brokers, clearinghouses, and exchanges as a whole. If a trader experiences a drop in funds below a minimum requirement, the clearinghouse 440 may issue a margin call requiring a deposit into the margin account to restore the trader's equity. A clearinghouse 440 may charge additional performance bond requirements at the clearinghouse's discretion. For example, if a clearinghouse's potential market exposure grows large relative to the financial resources available to support those exposures, the clearinghouse 440 may issue a margin call.

In another embodiment, the clearinghouse 440 may require a larger performance bond based on a credit check (e.g., an analysis of the credit worthiness, such as using a FICO™ or comparable score, inter alia) of the customer/trader. The credit check may be performed (i.e., initiated) by a clearinghouse 440 or another system associated with the financial computer system 400. In the example where the clearinghouse 440 performs the credit check, the clearinghouse 440 may send a message (e.g., enforcement message) to the financial computer system 400. If the credit check indicates that a customer/trader is a high risk, the enforcement message may increase the margin requirements of the customer/trader, or otherwise adjust the capabilities/constraints of the customer/trader commensurate with the higher risk. In the example where the financial computer system 400 initiates the credit check, the financial computer system 400 may send a message to one or more clearinghouses associated with the financial computer system 400 to update them on the increased/decreased risk associated with the customer/trader.

The principal means by which a clearinghouse 440 mitigates the likelihood of default is through mark-to-market (MTM) adjustments. The clearinghouse 440 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Numerous additional servers, computers, handheld devices, personal digital assistants, telephones and other devices may also be connected to financial computer system 400. Moreover, one skilled in the art will appreciate that the topology shown in FIG. 4 is merely an example and that the components shown in FIG. 4 may be connected by numerous alternative topologies.

The invention claimed is:

1. A computer system comprising:
   a processor; and
   a computer-readable medium containing computer-executable instructions that, when executed cause the processor to:
   (a) receive, via a virtual currency network, transaction data for a plurality of transactions for a virtual currency processed by the virtual currency network and stored on a blockchain, the transaction data including transaction inputs and transaction outputs;
   (b) determine, based on the received transaction data, a network utilization of the virtual currency network indicative of a transaction processing time for each of the plurality of transactions, wherein an increase in the network utilization is indicative of an increase in the transaction processing time and a reduction in a capacity of the virtual currency network to process transactions and a decrease in the network utilization is indicative of a decrease in the transaction processing time and an increase in the capacity of the virtual currency network to process transactions;
   (c) determine first transaction differences for the plurality of transactions for a period of time based on a difference between a sum of all transaction inputs and a sum of all corresponding transaction outputs associated with each transaction of the plurality of transactions, wherein each of the first transaction differences is related to a value for an amount a transaction validator who successfully validates and adds a block to the blockchain is allowed to keep as a reward therefore wherein the first transaction differences increase as the network utilization increases and decrease as the network utilization decreases;
   (d) determine, based on the network utilization, a second transaction difference for a new transaction to be submitted to the virtual currency network;
   (e) determine, based on the first transaction differences as compared to the second transaction difference, a value of a financial instrument held by one or more participants;
   (f) generate a minimum requirement for the one or more participants based at least partially on the value of the financial instrument;
   (g) determine whether an amount of funds on an account with a clearinghouse computer, coupled with the processor, for a participant of the one or more participants is below or exceeds the minimum requirement; and
   (h) one of credit or debit the account of the participant based on the determination that the amount of funds on the account is below or exceeds the minimum requirement.

2. The computer system of claim 1, further comprising:
   an order book module that determines bid and offer prices for the financial instrument; and
   a match engine coupled with the order book module and operative to match bids and offers for the financial instrument to execute transactions there between for the purchase and/or sale of the financial instrument and report executed transactions to the clearinghouse computer.

3. The computer system of claim 1, wherein the network utilization is determined based on an amount of average available space in one or more blocks of the block chain, and/or a number of transactions awaiting processing by the virtual currency network.

4. The computer system of claim 1, wherein the financial instrument comprises a futures contract.

5. The computer system of claim 4, wherein the value of the financial instrument comprises a cash settlement value of the futures contract.

6. The computer system of claim 1, wherein the virtual currency is a cryptocurrency.

7. The computer system of claim 1, wherein the first transaction differences are at least one of: (i) adjustable and (ii) varying over time.

8. A computer implemented method comprising:
receiving, by a processor via a network, transaction data for a plurality of transactions, the transaction data including transaction inputs and transaction outputs;
determining, by the processor based on the received transaction data, a network utilization of the network indicative of a transaction processing time for each of the plurality of transactions, wherein an increase in the network utilization is indicative of an increase in the transaction processing time and a reduction in a capacity of the network to process transactions and a decrease in the network utilization is indicative of a decrease in the transaction processing time and an increase in the capacity of the network to process transactions;
determining, by the processor, first transaction differences for the plurality of transactions based on a difference between a sum of all transaction inputs and a sum of all corresponding transaction outputs associated with each transaction of the plurality of transactions, wherein each of the first transaction differences relate to a value for an amount a transaction validator who successfully validates and adds a block to a blockchain is allowed to keep as a reward therefore;
determining, by the processor based on the network utilization, a second transaction difference for a new transaction to be submitted;
determining, by the processor based on the first transaction differences as compared to the second transaction difference, a first value of a financial instrument held by one or more participants;
generating, by the processor, a minimum requirement for the one or more participants based at least partially on the first value of the financial instrument;
determining, by the processor, whether an amount of funds on an account with a clearinghouse computer, coupled with the processor, for a participant of the one or more participants is below or exceeds the minimum requirement; and
one of crediting or debiting, by the processor, the account of the participant based on the determination that the amount of funds on the account is below or exceeds the minimum requirement.

9. The computer implemented method of claim 8, further comprising:
determining, by an order book module, bid and offer prices for the financial instrument; and
matching, by a match engine coupled with the order book module, bids and offers for the financial instrument to execute transactions there between for the purchase and/or sale of the financial instrument and reporting executed transactions to the clearinghouse computer.

10. The computer implemented method of claim 8, wherein the network utilization is determined based on an amount of average available space in one or more blocks of the block chain, and/or a number of transactions awaiting processing by the network.

11. The computer implemented method of claim 8, wherein determining the first value of the financial instrument based on the first transaction differences includes further determining a second value of the financial instrument based on an average of the first transaction differences over a contract period.

12. The computer implemented method of claim 8, wherein determining the first value of the financial instrument based on the first transaction differences includes further determining a second value of the financial instrument based on an average of the first transaction differences per a specified unit of data size over a contract period.

13. The computer implemented method of claim 8, wherein the financial instrument comprises a futures contract.

14. The computer implemented method of claim 13, wherein the first value of the financial instrument comprises a cash settlement value of the futures contract.

15. The computer implemented method of claim 8, wherein the transaction data comprises data for virtual currency transactions and wherein the network comprises a virtual currency network.

16. The computer implemented method of claim 15, wherein the virtual currency is a cryptocurrency.

17. The computer implemented method of claim 8, wherein the transaction differences are at least one of: (i) adjustable and (ii) varying over time.

18. A computer system comprising:
means for receiving transaction data for a plurality of transactions in virtual currency processing network, the transaction data including transaction inputs and transaction outputs;
means for determining, based on the received transaction data, a network utilization of the network indicative of a transaction processing time for each of the plurality of transactions, wherein an increase in the network utilization is indicative of an increase in the transaction processing time and a reduction in a capacity of the network to process transactions and a decrease in the network utilization is indicative of a decrease in the transaction processing time and an increase in the capacity of the network to process transactions;
means for determining first transaction differences for the plurality of transactions based on a difference between a sum of all transaction inputs and a sum of all corresponding transaction outputs associated with each transaction of the plurality of transactions, wherein each of the first transaction differences relate to a value for an amount a transaction validator who successfully validates and adds a block to a blockchain is allowed to keep as a reward therefore;
means for determining, based on the network utilization, a second transaction difference for a new transaction to be submitted;
means for determining, based on the first transaction differences as compared to the second transaction difference, a first value of a financial instrument held by one or more participants;
means for generating a minimum requirement for the one or more participants based at least partially on the first value of the financial instrument;

means for determining whether an amount of funds on an account with a clearinghouse computer for a participant of the one or more participants is below or exceeds the minimum requirement; and means for one of crediting or debiting the account of the participant based on the determination that the amount of funds on the account is below or exceeds the minimum requirement.

19. The computer system of claim 18, wherein the network utilization is determined based on an amount of average available space in one or more blocks of the block chain, and/or a number of transactions awaiting processing by the virtual currency network.

20. The computer system of claim 18, further comprising:

means for determining bid and offer prices for the financial instrument; and means for matching bids and offers for the financial instrument to execute transactions there between for the purchase and/or sale of the financial instrument and reporting executed transactions to the clearinghouse computer.

\* \* \* \* \*

UNITED STATES PATENT AND TRADEMARK OFFICE
CERTIFICATE OF CORRECTION

| | |
|---|---|
| PATENT NO. | : 11,488,245 B2 |
| APPLICATION NO. | : 17/169688 |
| DATED | : November 1, 2022 |
| INVENTOR(S) | : Ryan Pierce, Mansoor Ahmed and John Plante |

It is certified that error appears in the above-identified patent and that said Letters Patent is hereby corrected as shown below:

In the Claims

Column 20, Claim 18, Line 36:
Please insert --a-- before "virtual"

Signed and Sealed this
Twentieth Day of December, 2022

*Katherine Kelly Vidal*

Katherine Kelly Vidal
*Director of the United States Patent and Trademark Office*